United States Patent
Gronbach

(10) Patent No.: US 7,101,129 B2
(45) Date of Patent: Sep. 5, 2006

(54) MACHINE TOOL

(75) Inventor: Hans Gronbach, Eisenberg (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 356 days.

(21) Appl. No.: 10/712,695

(22) Filed: Nov. 12, 2003

(65) Prior Publication Data

US 2004/0115019 A1 Jun. 17, 2004

(30) Foreign Application Priority Data

Nov. 13, 2002 (DE) ................. 102 52 824

(51) Int. Cl.
*B23C 1/00* (2006.01)
(52) U.S. Cl. ................. 409/235; 408/234; 409/134; 409/137
(58) Field of Classification Search ............. 409/134, 409/137, 197, 198, 199, 201, 219, 221, 235; 408/67, 89, 234
See application file for complete search history.

(56) References Cited

U.S. PATENT DOCUMENTS

| | | | | |
|---|---|---|---|---|
| 3,703,847 A | * | 11/1972 | Pillot et al. ................. | 409/165 |
| 4,705,438 A | * | 11/1987 | Zimmerman et al. ........ | 409/132 |
| 5,435,675 A | * | 7/1995 | Rutschle ..................... | 409/134 |
| 6,428,452 B1 | | 8/2002 | Dahlstrom et al. | |
| 6,682,278 B1 | * | 1/2004 | Gronbach et al. ........... | 409/235 |
| 6,786,686 B1 | * | 9/2004 | Koike ......................... | 409/235 |
| 6,976,821 B1 | * | 12/2005 | Zarske ........................ | 414/680 |

2003/0049087 A1 3/2003 Gronbach et al.

FOREIGN PATENT DOCUMENTS

| | | |
|---|---|---|
| DE | 298 01 236 U1 | 4/1998 |
| DE | 196 45 324 A1 | 5/1998 |
| DE | 19920940 A1 * | 11/2000 |
| DE | 199 40927 A1 | 3/2001 |
| DE | 19944569 C1 * | 5/2001 |
| DE | 19952530 A1 * | 5/2001 |
| JP | 02279249 A * | 11/1990 |
| JP | 10118887 A * | 5/1998 |
| JP | 10138090 A * | 5/1998 |
| WO | WO 02/072308 A1 | 9/2002 |

OTHER PUBLICATIONS

Eberlein, et al. Bearbeitungszentrum mit Tripodentechnik, In: VDI-Z 143 (2001) No. 6, (Jun. 2001), p. 38-40.

* cited by examiner

*Primary Examiner*—Daniel W. Howell
(74) *Attorney, Agent, or Firm*—The Maxham Firm

(57) ABSTRACT

A machine tool for machining large-area workpieces. A column can be moved along one coordinate axis over a long bed. A machining unit, movable at the movable column along at least two other coordinate axes, has a pivotable working spindle. At least one approximately plate-like work carrier can be pivoted from a horizontal set-up position into a vertical machining position. A tripod configuration of the machining unit has a central support pipe and three telescopic legs spaced about 120° with respect to one another. The movable column has, in a central recess, a universal bearing supporting the central support pipe. In each of two lower and one upper recesses a universal bearing for the telescopic legs is provided. A retainer supporting the pivotable working spindle is positioned next to the work area on one end of the central support pipe and is rotatable about an axis of the central support pipe.

10 Claims, 1 Drawing Sheet

MACHINE TOOL

BACKROUND OF THE INVENTION

1. Field of the Invention

The present invention relates generally to machine tools, and more specifically to machine tools for machining large area workpieces.

2. Discussion of Related Art

Machine tools or machining centers have been employed for some time to mill and drill large workpieces. They have also been used for large area workpieces commonly found, for example, in automobile or aircraft manufacturing. Generally, each machine tool has two workpiece stations arranged next to one another on the rear side of a long bed and large-area work carriers. They are alternately pivoted from a horizontal set-up position to a vertical operating position. This configuration enables continuous manufacturing. The workpieces in the vertical position can be machined while workpieces already machined can be simultaneously demounted from the horizontally positioned work carrier. Alternatively, new workpieces can be mounted thereon.

In order to pivot the substantially plate-like work carriers, it is preferred to use sufficiently long pressure medium cylinders engaging the rear side. The length of the bed and the guides mounted thereon is chosen such that the movable column can alternately be moved in front of one station or the other. When large-area workpieces are machined, a large number of chips are produced as a result of the high cutting capacities of the machining units. In order to protect the vicinity of the machine from being soiled by chips and liquids, the work areas in front of both stations are surrounded by a continuous protective cabin. In addition, the work area in front of the work carrier pivoted into its horizontal set-up position is separated by a door to prevent soiling of the set-up station.

Current machine tools of this type employ movable columns where the milling head of the machining unit is arranged in a slide that is movable along one coordinate axis. The working spindle can move along its longitudinal axis in the machining unit. These machines are limited in that the utilization of the respective working spaces is not optimal. In addition, proposals have been made for machine tools, designed according to the hexapode principle, of the above-mentioned type. However, on account of problems regarding the accurate and highly stable tool positioning during the machining step, these proposals have not yet been put into practice.

SUMMARY OF THE INVENTION

The present invention relates to a machine tool for machining large-area workpieces. In one embodiment, the workpieces are positioned edge-wise. The machine tool has a movable column movable along the X-axis over a long bed, and a machining unit movable at the movable column at least along the Y-axis and Z-axis. A pivotable working spindle is provided, and at least one approximately plate-like work carrier is provided. The work carrier can be pivoted from a horizontal set-up position into a vertical machining position.

It is one object of the invention to provide a machine tool for machining large-area workpieces that are positioned edge-wise. The machine tool preferably has a relatively simple structural design and enables precise positioning of the respective tools in an enlarged working space, while retaining the workpiece tightly fixed, even under high working loads.

In one embodiment, the machining unit is a tripod configuration having a central support pipe and three telescopic legs typically angularly spaced about 120° with respect to one another. The movable column has a universal bearing, in a central, approximately horizontal, recess, for the longitudinally slidable support pipe. The movable column also has one universal bearing for each telescopic leg in two lower recesses and one upper recess. A retainer, rotatable about the rotor axis of the pivotable working spindle, is arranged on the top of the support pipe.

In connection with the movement of the three telescopic legs, the longitudinally slidable support of the support pipe positions the machining head or the tool inserted in the working spindle in a highly accurate and fixed manner with respect to a given working position. The slidable support of the support pipe is highly rigid and is positioned in the universal bearing, which is arranged approximately centrally within the movable column. In addition, the tripod configuration optimizes the available working space since the respective tool can be positioned accurately by simple sliding motions of the telescopic legs and the support pipe, even in extreme positions. Thus, the space requirement is reduced with respect to conventional machines that have a comparable output.

According to a further embodiment of the invention, the machine tool has two alternating set-up and working stations arranged one behind the other. Viewed from the X-axis, each station has a pivotable tool carrier. The respective set-up space is separated from the work area by a movable door. The movable door is a one-part sliding door. It can be moved in front of the respectively pivoted-down work carrier, so that one half of the work area is separated by the tool carrier arranged in its edgewise position, and the other half of the work area is separated from the area by the sliding door.

In order to ensure an automated sequence of the various machining steps, which is common in many machine tools, the sliding door is slidable by means of a program-controlled linear drive. These can be, for example, a pressure medium cylinder, an electric linear motor, a worm gear or a belt drive.

BRIEF DESCRIPTION OF THE DRAWING

Further particularities and advantages of the invention will become clear from the following description of preferred embodiments with reference to the drawing, in which.

DETAILED DESCRIPTION OF THE PREFERRED EMBODIMENTS

Figure 1:
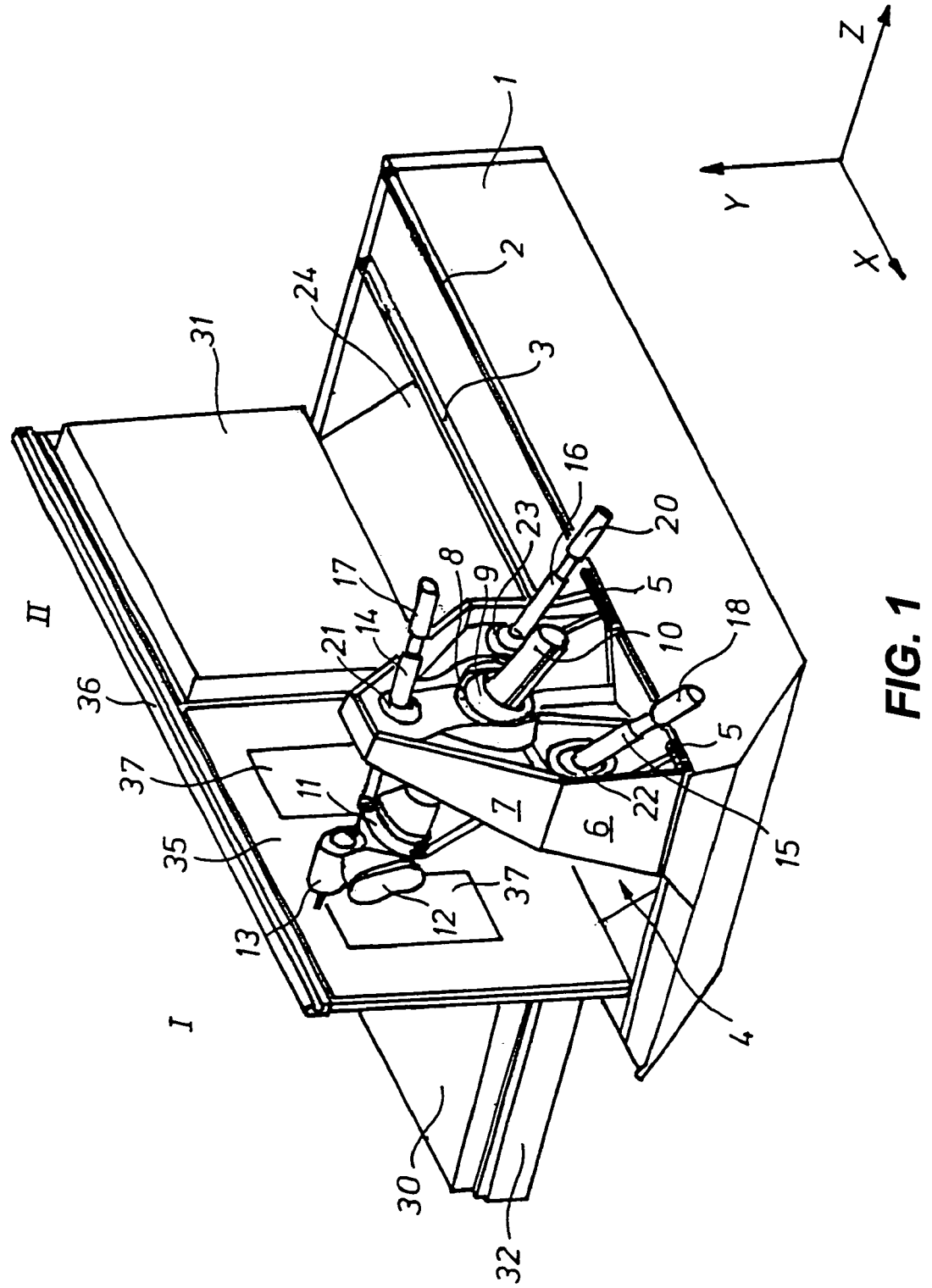
FIG. 1 is a perspective view of a machining unit according to one embodiment of the invention.

Referring now to FIG. 1, the machine tool contains relative shallow long bed 1, on the top side of which two guide rails 2 and 3 are mounted. Movable column 4 can be moved on guide rails 2 and 3 by means of a linear drive (not shown), for example, a worm gear or an electric linear motor. This movement can be in the direction of the X-axis defined by the extension of guide rails 2 and 3.

In a front view, movable column 4 has approximately the shape of a house. It has a relatively wide base provided with guide sockets 5, as well as roof-like upwardly tapering top portion 7. The movable column interior, which is defined by the external walls, contains partition walls and reinforcement ribs so that an altogether highly rigid overall structure results. In approximately the central portion of movable column 4, universal bearing 9 is arranged in recess 8. The recess accommodates, in a longitudinally slidable fashion, dimensionally stable support pipe 10.

As shown in FIG. 1, the top end of support pipe 10 is formed as conically widening bell 11, on which swivel head 12 is mounted such that it can be rotated about the longitudinal axis of the support pipe. Swivel head 12 forms the carrier for working spindle 13. The working spindle is pivotable about an additional axis. Moreover, the telescopic parts of three telescopic legs 14, 15, and 16 are mounted on the lateral side of bell 11 such that they are movable about several axes. Each leg has, for example, hydraulic linear drive 17, 18 or 20. Each of these three telescopic legs is preferably spaced by an angle of about 120° relative to the longitudinal axis of support pipe 10 and are supported in universal bearings 21, 22 or 23 in movable column 4. The illustrated arrangement of one upper telescopic leg 14 and two lower telescopic legs 15 and 16 provides favorable overall stability of the machining unit.

The machine tool contains two work or set-up stations, I and II. Plate-like work carriers 30 and 31 are positioned on the rear side of long bed 1 next to one another. Both work carriers 30 and 31 are separately pivotable between a horizontal position and a vertical position. As shown, work carrier 30 of station I is in its horizontal position where it rests on base 32. The base contains one pressure medium cylinder (not shown) for each work carrier 30 and 31. The piston engages the rear side of the respective work carrier to pivot it from the horizontal into the vertical position and vice versa.

Between the working space, which extends almost over the entire length of long bed 1 of the machining unit and the alternating set-up station I or II where the associated work carrier is in its horizontal position, sliding door 35 is arranged. The sliding door can be moved along upper longitudinal rails 36 and lower ones (not shown) by means of a linear drive (not shown). This sliding door contains observation windows 37.

In order to machine a workpiece clamped in the vertical working position on work carrier 31, movable column 4 is moved in guide rails 2 and 3 to the right so that the machining unit, containing working spindle 13, is located in front of the workpiece. In combination with the rotatable retainer of swivel head 12 and the pivotable support of the working spindle (also referred to herein as "milling head"), the tripod configuration enables a positioning of the respective workpiece in front of the outermost edge regions of work carrier 31. The tool clamped in working spindle 13 is able to adopt any angular position in space. The high inherent rigidity of support pipe 10 and its support from three telescopic legs 14, 15, and 16 also ensures an accurate and stable positioning of spindle head 13 so as to enable high chip outputs and small machining tolerances.

Having machined the workpiece clamped in work carrier 31, the work carrier is pivoted back into its horizontal position by means of its rear actuator. The resulting free space is closed by moving door 35 to the right. Then work carrier 30 provided with a new workpiece can be pivoted from its illustrated horizontal position into a vertical machining position. After moving movable column 4 into the position shown in the drawing, the new workpiece can be machined. In this case the front machining space is separated from the rear set-up space by the moved sliding door 35, and also by the upright work carrier 31.

One advantage of the machine tool according to the invention is provided by the treatment or removal of the chips produced during the machining step. Together with the supplied liquids, chips drop into elongate tub 24, which is provided under the working space and having the shape of a conical trough in the bottom portion of which a conventional chip conveyor is arranged.

The invention is not limited to the embodiment shown in FIG. 1. For example, instead of two guide rails 2 and 3 arranged in a horizontal plane, the long bed can also be made such that the movable column rests on an inclined plane, with front guide rail 2 extending at a higher level than rear guide rail 3. Furthermore, it is also possible to mount on the extended end portion of the support pipe a differently designed milling head, which enables an alignment of tool spindle 13 at different angular positions in space. In order to machine extremely long workpieces, a single continuous work carrier can be used instead of two separate work carriers 30 and 31. In this case sliding door 35 will not be present.

While the present invention has been illustrated and described by means of specific embodiments, it is to be understood that numerous changes and modifications can be made therein without departing from the spirit and scope of the invention. Accordingly, the invention is limited only by the claims.

What is claimed is:

1. A machine tool for machining large-area workpieces, the machine tool comprising:
    a bed;
    a column movable along one coordinate axis over the bed;
    a machining unit positioned on one side of the column next to a work area, said machining unit being movable along at least two other coordinate axes, said machining unit further comprising:
        a pivotable working spindle;
        a central support pipe and three telescopic legs positioned at an angle of approximately 120° with respect to one another; and
        a retainer supporting the pivotable working spindle, said retainer positioned next to the work area on one end of the central support pipe and rotatable about an axis of the central support pipe;
    at least one work carrier, which can be pivoted from a horizontal set-up position into a vertical machining position; and
    two alternating working stations arranged side-by-side behind said bed, said working stations being separated by a movable door;
    said movable column having a central recess and a universal bearing in said recess supporting said central support pipe therein, said movable column also having three lower recesses and a universal bearing in each of the three lower recesses supporting said three telescopic legs therein.

2. The machine tool according to claim 1, wherein said central support pipe is longitudinally slidable.

3. The machine tool according to claim 1, further comprising at least two pivotable work carriers.

4. The machine tool according to claim 3, wherein one said work carrier is in a horizontal position in the one working station where set-up of the workpiece is performed.

5. The machine tool according to claim 4, wherein the other said work carrier is in a vertical position in the working station where machining is performed.

6. The machine tool according to claim 1, wherein a chip collector formed as a continuous conically shaped trough is positioned under the work area between said bed and said movable door.

7. The machine tool according to claim 1, wherein said movable door is a one-part slidable door, which can be moved selectively in front of each work carrier.

8. The machine tool according to claim 7, wherein said movable door can be moved by means of a program-controlled linear drive.

9. The machine tool according to claim 8, wherein said program-controlled linear drive is selected from the group consisting of a pressure medium cylinder, an electric linear motor, a worm gear, and a belt drive.

10. The machine tool according to claim 9, wherein a chip collector formed as a continuous conically shaped trough is positioned under the work area between said bed and said vertically positioned work carrier.

* * * * *